March 29, 1932. J. E. KEAN 1,851,911
LOCKING DEVICE FOR AUTOMOBILE WIRE WHEELS
Filed Aug. 3, 1931
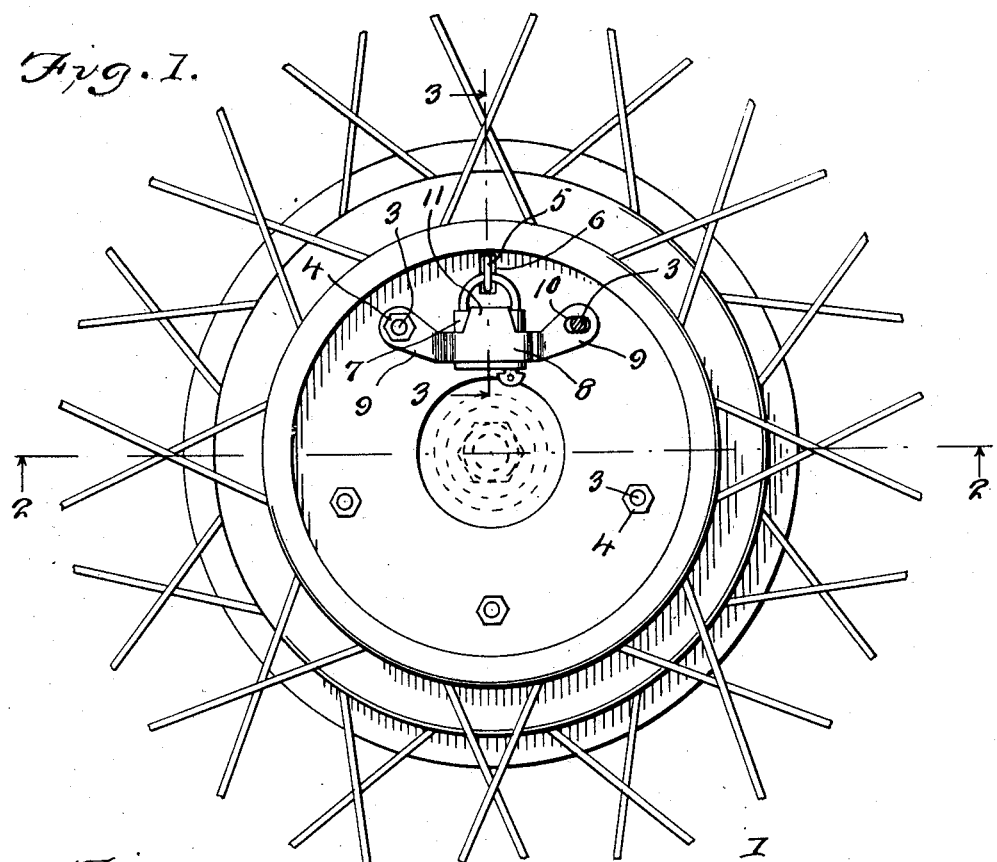
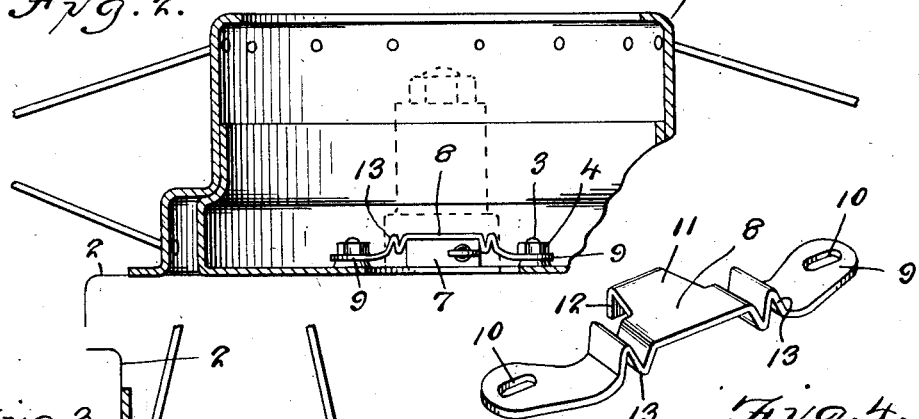
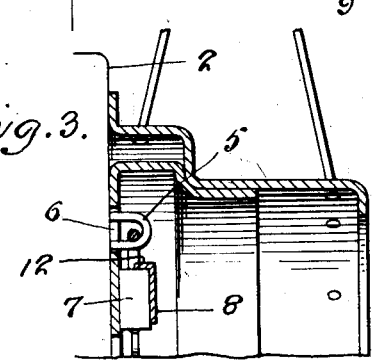
Joseph E. Kean
INVENTOR
BY Victor J. Evans and Co.
ATTORNEY Patented Mar. 29, 1932

1,851,911

UNITED STATES PATENT OFFICE

JOSEPH EMMETT KEAN, OF HOMEWOOD, ALABAMA

LOCKING DEVICE FOR AUTOMOBILE WIRE WHEELS

Application filed August 3, 1931. Serial No. 554,878.

This invention relates to securing devices especially adapted for use on a demountable vehicle wheel employing a padlock for securing the wheel against unauthorized removal and has for the primary object, the provision of a device of the above stated character which may be easily and quickly applied to a wheel and the padlock so that the latter will be prevented from rattling or moving relative to the wheel.

With this and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a fragmentary side elevation illustrating a securing device applied to a wheel and padlock of said wheel.

Figure 2 is a sectional view taken on the line 2—2 of Figure 1.

Figure 3 is a sectional view taken on the line 3—3 of Figure 1.

Figure 4 is a perspective view illustrating the securing device.

Referring in detail to the drawings, the numeral 1 indicates a conventional type of demountable vehicle wheel secured to the brake drum 2 by screw threaded lugs 3 receiving nuts 4. To prevent unauthorized removal of the wheel from the brake drum, a U-shaped yoke 5 is secured to the brake drum 2 and extends through a slot 6 in the hub portion of the wheel and receives the shackle of a padlock 7. To prevent the padlock from moving relative to the hub of the wheel and U-shaped yoke 5 my invention is employed and comprises a plate 8 adapted to overlie the lock and has formed upon its ends legs 9, the free ends of which are provided with elongated openings 10 to receive a pair of studs 3 prior to applying the nuts 4 to said studs. Formed on one side edge of the plate 8 is a tongue 11 provided with a laterally extending flange 12 adapted to engage over the upper end of the lock and between the legs of the shackle thereof. With the device so applied to the lock and a pair of studs 3, the lock will be held tightly against the hub portion of the wheel and prevented from rattling or shifting in its position during the rotation of the wheel. The legs 9 are provided with a plurality of crimps or angularly disposed portions 13 adapted to permit said legs to readily flex and adjust themselves when applied to the studs with the plate overlying the padlock.

While I have shown and described the preferred embodiment of my invention, it will be understood that minor changes in construction, combination and arrangement of parts may be made without departing from the spirit and scope of my invention, as claimed.

Having thus described my invention, what I claim is:

1. The combination with a wheel having the hub thereof detachably mounted by screw threaded studs receiving nuts and a padlock for locking the wheel against unauthorized removal, a plate engaging the padlock, and legs on said plate and secured to the wheel by a pair of said studs and their respective nuts.

2. The combination with a wheel having the hub thereof detachably mounted by screw threaded studs receiving nuts and a padlock for locking the wheel against unauthorized removal, a plate engaging one face of the padlock, an angularly disposed tongue on said plate and engaging another face of the padlock, and legs on said plate and secured to the wheel by a pair of said studs and their respective nuts.

3. The combination with a wheel having the hub thereof detachably mounted by screw threaded studs receiving nuts and a padlock for locking the wheel against unauthorized removal, a plate engaging one face of the padlock, an angularly disposed tongue on said plate and engaging another face of the padlock, and legs on said plate and secured to the wheel by a pair of said studs and their respective nuts, said legs having a plurality of crimps to permit said legs to readily flex when adjusting the plate to the lock and the legs to the studs.

4. The combination with a tire carrying member detachably secured to a carrier by fasteners and held to said carrier against removal by a lock, of a holding device secured to the carrier by said fasteners and engaging the lock to hold the latter against removal and from having movement relative to the carrier.

In testimony whereof I affix my signature.

JOSEPH E. KEAN.